United States Patent [19]

Takeuchi et al.

[11] 4,409,129

[45] Oct. 11, 1983

[54] METHOD OF MANUFACTURING CATALYST

[75] Inventors: Seizi Takeuchi, Hitachiota; Shimpei Matsuda, Tokai, both of Japan

[73] Assignee: Hitachi, Ltd., Tokyo, Japan

[21] Appl. No.: 314,051

[22] PCT Filed: Mar. 4, 1981

[86] PCT No.: PCT/JP81/00044

§ 371 Date: Oct. 19, 1981

§ 102(e) Date: Oct. 19, 1981

[87] PCT Pub. No.: WO81/02532

PCT Pub. Date: Sep. 17, 1981

[30] Foreign Application Priority Data

Mar. 5, 1980 [JP] Japan ................................. 55-26689

[51] Int. Cl.$^3$ ................ B01J 21/18; B01J 23/42; B01J 23/44; B01J 23/46
[52] U.S. Cl. ................................. 502/185; 502/150; 502/263; 502/261; 502/313; 502/325; 502/301; 502/327

[58] Field of Search ................. 252/447, 472, 477 Q, 252/430, 455 R, 460, 466 PT, 470

[56] References Cited

U.S. PATENT DOCUMENTS 3,380,934 4/1968 Batzold ........................... 252/477 Q
4,192,907 3/1980 Jalan et al. ..................... 252/477 Q
4,255,247 3/1981 Oda et al. ....................... 252/477 Q

*Primary Examiner*—W. J. Shine
*Attorney, Agent, or Firm*—Antonelli, Terry & Wands

[57] ABSTRACT

Disclosed is a method of manufacturing a catalyst composed of fine metal particles having a large specific surface area, such as a platinum black catalyst. According to this method, a solution containing a platinum ion and at least one metal ion or complex ion having an oxidation-reduction potential different from that of platinum is reduced, and the metal having an oxidation-reduction potential different from that of platinum is dissolved out from the precipitated particles. The catalyst obtained according to this method has a very fine particle size and is suitable for an electrode of a fuel cell.

8 Claims, 3 Drawing Figures

METHOD OF MANUFACTURING CATALYST

TECHNICAL FIELD

The present invention relates to a method of manufacturing a catalyst. More specifically, the present invention relates to a method of producing a catalyst suitable for an electrode of a fuel cell, such as a platinum black catalyst.

BACKGROUND ART

As the method of manufacturing a platinum black catalyst used for a fuel cell, there have heretofore been mainly adopted the following two methods. According to one method, a platinum ingot is mechanically pulverized, and this method is ordinarily called "a dispersing method". This dispersing method is defective in that the size of platinum particles is large and the particle size distribution is broad and not uniform.

According to the other method, a solution of a platinum salt is reacted with a reducing agent to precipitate platinum. This method is ordinarily called "a flocculation method". A formalin reducing method is most popular as the flocculation method, and according to this method, a solution of chloroplatinic acid is reacted with formalin, an alkali metal hydroxide is added to the reaction mixture under cooling and formed platinum black is separated. Secondary cohesion takes place in the obtained platinum black particles because of the hydrophobic force thereof, and the average particle size is relatively large and several thousand angstroms and the surface area is scores of square meters per gram.

The larger is the specific surface area, the higher is the activity of the catalyst, and a smaller particle size of particles is more effective for increasing the specific surface area. Accordingly, development of a method of manufacturing a catalyst composed of fine particles is of great significance.

DISCLOSURE OF THE INVENTION

It is a primary object of the present invention to provide a method of manufacturing a catalyst in which fine particles having a larger specific surface area than that of particles obtained by the conventional methods are obtained.

In accordance with the present invention, there is provided a method of manufacturing a catalyst, which comprises the step of reducing a solution containing at least two metal ions or complex ions differing in the oxidation-reduction potential to precipitate metal particles and the step of dissolving out particles of at least one metal from the precipitated metal particles.

As an example of the solution containing at least two metal ions or complex ions, there can be mentioned a solution containing a platinum ion and a metal or complex ion as a second element different from platinum in the oxidation-reduction potential. It has been found by the electron microscope observation that the size of particles formed by secondary cohesion of platinum particles and second metal particles is as small as several hundred angstroms because of a certain action of fine platinum particles and second metal particles. If the metal as the second element is dissolved out from the precipitated particles, the platinum particles are rendered porous and the specific surface area of the platinum particles becomes as large as about 70 to about 100 m²/g.

The present invention can be applied to not only a platinum black catalyst but also all the catalysts where the above-mentioned combination of metal ions is possible.

Incidentally, by the term "platinum black" is meant a fine particle of platinum. Although a metal has a peculiar inherent color, as the metal is powdered to a fine particle, with reduction of the particle size the color grows black. Therefore, a fine particle of platinum is ordinarily called "platinum black".

Metal particles may be precipitated in the form supported on a carrier. In this case, it is necessary to insert the carrier in the solution. By dissolving out particles of a metal having a lower reduction potential from metal particles supported on the carrier, there can be obtained a carrier-supported catalyst. As the carrier, there can be used alumina, silica, titania, active carbon, graphite, carbon black, diatomaceous earth, chromium oxide, zirconia, tungsten oxide and porous polytetrafluoroethylene, and mixtures thereof.

BEST MODE FOR CARRYING OUT THE INVENTION

Figure 1:
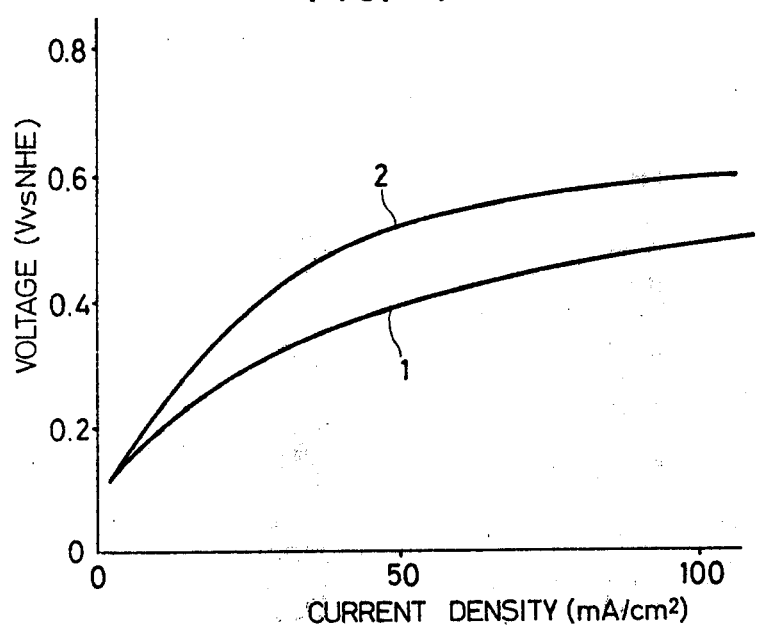
FIG. 1 is a graph illustrating the current-voltage characteristic of a catalyst prepared according to one embodiment of the method of the present invention.

The present invention will now be described in detail with reference to the following Examples.

EXAMPLE 1

When a solution containing chloroplatinic acid and palladium chloride is reduced with formic acid, platinum-palladium mixed particles are precipitated in the solution. The reaction is represented by the following reaction formulae:

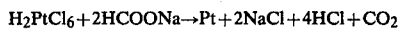

$H_2PtCl_6 + 2HCOONa \rightarrow Pt + 2NaCl + 4HCl + CO_2$

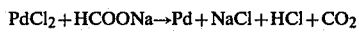

$PdCl_2 + HCOONa \rightarrow Pd + NaCl + HCl + CO_2$

The precipitated mixed particles are separated from the solution, and when nitric acid is added to the precipitated particles and the particles are heated, Pd alone is selectively dissolved out while platinum alone is left in the form of particles. Thus, a platinum black catalyst is obtained. This process will now be described more specifically.

200 ml of an aqueous solution containing 13 g of $H_2PtCl_6.6H_2O$ and 10 g of $PdCl_2.2H_2O$ is stirred at an elevated temperature of about 60° C., and a 20% solution of formic acid is gently dropped to the above solution. Thus, the reduction reaction is initiated and advanced. When the supernatant becomes transparent, the reaction is terminated. The form platinum articles are separated from the solution by filtration. The separated platinum particles are sufficiently washed with water and dried to obtain a platinum-palladium mixed catalyst. Then, about 50 ml of concentrated nitric acid is added to 5 g of the so obtained powdery catalyst, and the mixture is heated in the boiling state for about 20 minutes. The mixture is naturally cooled, diluted with water and filtered. The filtered solid is sufficiently washed with water and dried to obtain a fine platinum black catalyst. It is preferred that palladium be substantially dissolved out to obtain a catalyst composed solely of platinum particles.

Average particle sizes and specific surface areas of platinum black obtained according to the conventional flocculation method and platinum black prepared in this Example are measured. It is found that the platinum black prepared according to the conventional method is characterized by an average particle size of about 3000 Å and a specific surface area of about 30 m²/g and the platinum black prepared according to the method of this Example is characterized by an average particle size of about 500 Å and a specific surface area of about 100 m²/g. Thus, it is confirmed that the size of the catalyst particles is made finer and the specific surface area is increased according to the present invention.

As a comparison to be used for demonstrating the capacity of the platinum black obtained in this Example, a platinum-palladium mixed particle, namely platinum-palladium black, is prepared in the same manner as described above except that the step of dissolving out palladium is omitted. This platinum-palladium black, platinum black prepared according to the conventional method and platinum black prepared in this Example are used for production of electrodes for a methanol-air fuel cell. With respect to each electrode, the activity of anodic oxidation of 2 mol/l of methanol in 3 mol/l of $H_2SO_4$ is measured. Namely, the electrode is immersed in a solution of $H_2SO_4$ and methanol and the single electrode capacity is evaluated at room temperature. The electrode used is prepared by coating the above-mentioned catalyst on foamed graphite by using a vinyl chloride resin as a binder and drying the coating at 120° C. for 2 hours. The amount coated of the catalyst is 25 mg/cm² in case of platinum black prepared according to the conventional method and palladium-free platinum black, namely platinum black prepared in this Example, and the amount coated of the catalyst is 12.5 mg of platinum per cm² and 12.5 g of palladium per cm² in case of platinum-palladium black.

Current-voltage characteristics of these catalysts are shown in FIG. 1, in which curve 1 shows the characteristic of the catalyst of the present invention, namely the palladium-free platinum black catalyst, and curve 2 shows the characteristics of two other catalysts.

In a methanol-air fuel cell, methanol acts as the negative electrode. Accordingly, if the change of the voltage from the open-circuit voltage is smaller to the value of the current taken out, namely if the curve is located at a lower part in FIG. 1, the capacity is higher.

As is seen from FIG. 1, the curve of the catalyst of the present invention is located below the curve of the conventional catalyst, and therefore, the catalyst of the present invention is excellent in the catalytic activity.

EXAMPLE 2

A mixed solution containing chloroplatinic acid, palladium chloride and ruthenium chloride is reduced with formic acid. The reaction is represented by the following reaction formulae:

$$H_2PtCl_6 + 2HCOONa \rightarrow Pt + 2NaCl + 4HCl + CO_2$$

$$PdCl_2 + HCOONa \rightarrow Pd + NaCl + HCl + CO_2$$

$$2RuCl_3 + 3HCOONa \rightarrow 2Ru + 3NaCl + 3HCl + 3CO_2$$

Mixed particles of platinum-palladium-ruthenium are precipitated by this reaction. Nitric acid is added to the mixed particles and the mixture is heated. Palladium alone is selectively dissolved and a binary catalyst of platinum-ruthenium is obtained. This reaction will now be described more specifically.

200 ml of an aqueous solution containing 13 g of $H_2PtCl_6$, 10 g of $PdCl_2$ and 1 g of $RuCl_3$ is prepared and heated at about 60° C., and a 20% solution of sodium formate is added to the solution under stirring. The reduction is advanced. When the supernatant becomes transparent, addition of sodium formate is stopped. The formed precipitate is recovered by filtration, washed sufficiently with water and dried to obtain a powdery mixed catalyst of platinum-ruthenium-palladium. Then, 50 ml of concentrated nitric acid is added to 5 g of the powdery catalyst, and the mixture is heated in the boiling state for about 20 minutes. The reaction mixture is naturally cooled, diluted with water and filtered, and the recovered solid is sufficiently washed with water and dried to obtain a fine mixed catalyst of platinum-ruthenium.

As a comparison to be compared with the catalyst of this Example with respect to the catalytic activity, a platinum-ruthenium-palladium powdery catalyst is prepared in the same manner as described above except that palladium is not dissolved out.

The so obtained two catalysts are independently coated on foamed graphite in the same manner as described in Example 1. In case of platinum-ruthenium-palladium, the amounts coated of platinum, ruthenium and palladium are 12 mg, 1 mg and 12 mg per cm², respectively, and in case of palladium-free platinum-ruthenium, the amounts coated of platinum and ruthenium are 25 mg and 1 mg per cm². In the same manner as described in Example 1, the activity of the anodic oxidation of 2 mol/5 of methanol in 3 mol/l of $H_2SO_4$ is measured and the single electrode capacity is evaluated.

Figure 2:
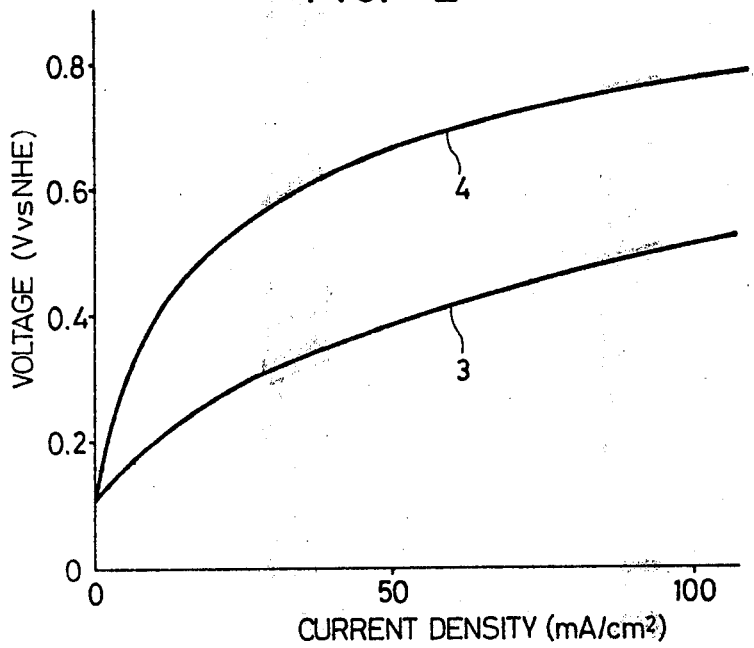
FIG. 2 is a graph illustrating the current-voltage characteristic of a catalyst prepared according to another embodiment of the method of the present invention.

Current-voltage characteristics are shown in FIG. 2, The curve 3 of the catalyst of the present invention is located below the curve 4 of the catalyst of the conventional method in which palladium is not dissolved out. Accordingly, it is apparent that the catalyst of the present invention is excellent in the catalytic activity.

EXAMPLE 3

In this Example, a carrier-supported catalyst is tested with respect to the activity of the anodic oxidation of 2 mol/l of methanol in 3 mol/l of $H_2SO_4$ in the same manner as described in Example 1.

Active carbon is used as the carrier. The carrier is thrown into a mixed solution of chloroplatinic acid and palladium chloride so that the total amount of platinum and palladium supported on the carrier is 20% by weight. The active carbon-containing liquid is heated at 90° C. and formic acid is added thereto under violent agitation to effect reduction. The formed precipitate is recovered by filtration, washed with water and dried to obtain a catalyst. A part of the so formed catalyst is treated with concentrated nitric acid to dissolve out palladium and form a palladium-free platinum catalyst. These platinum catalysts supported on active carbon are independently coated on foamed graphite by using polytetrafluoroethylene as a binder, and sintering is carried out at 200° C. in a hydrogen gas atmosphere to obtain electrodes. These electrodes are tested with respect to the anodic oxidation activity in the same manner as in the foregoing Examples. In case of the platinum-palladium catalyst, the amounts coated of platinum and palladium are 10 mg and 0.4 mg per cm², respectively, and in case of the palladium-free platinum catalyst, the amount coated of platinum is 10 mg per cm².

Figure 3:
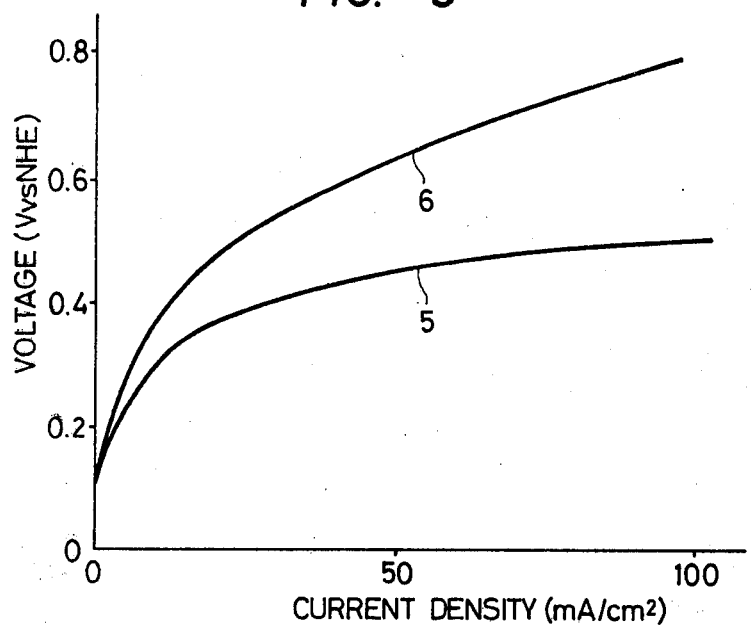
FIG. 3 is a graph illustrating the current-voltage characteristic of a catalyst prepared according to still another embodiment of the method of the present invention.

Current-voltage characteristics are shown in FIG. 3.

The curve 5 of the catalyst of the present invention is located below the curve 6 of the catalyst according to the conventional method. It is apparent that the catalyst of the present invention is excellent in the catalytic activity.

The carrier to be used for the catalyst for an electrode of a fuel cell is required to have a good electric conductivity, a sufficient resistance against a sulfuric acid solution having a concentration of 3 mol/l at 60° C. and a large specific surface area. In view of these requirements, active carbon, graphite and carbon black, especially active carbon, are preferred as the catalyst.

As will be apparent from the results of the foregoing Examples, the particle size of the catalyst obtained according to the method of the present invention is much smaller than that of the catalyst prepared according to the conventional method, and therefore, the specific surface area can remarkably be increased, with the result that the catalytic activity can be enhanced.

What is claimed is:

1. A method of manufacturing a catalyst supported by a carrier, which comprises the step of reducing a solution containing a platinum ion and at least one metal ion having an oxidation-reduction potential different from that of platinum to precipitate metal particles onto a carrier and the step of dissolving out particles of the at least metal having an oxidation-reduction potential different from that of platinum from the precipitated metal particles obtained by the reduction to form a catalyst supported by said carrier; the metal ion having an oxidation-reduction potential different from that of platinum being a metal ion having a reduction potential lower than that of platinum.

2. A method of manufacturing a catalyst according to claim 1, wherein the metal ion having a reduction potential lower than that of platinum is a palladium ion and palladium is dissolved out from the precipitated metal particles obtained by the reduction.

3. A method of manufacturing a catalyst according to claim 1, wherein the metal ion having a reduction potential lower than that of platinum includes a palladium ion and a ruthenium ion and palladium is dissolved out from the precipitated metal particles obtained by the reduction.

4. A method of manufacturing a catalyst supported by a carrier, which comprises the step of adding a carrier of electric conductivity to a solution containing at least two metal ions or complex ions differing in the reduction potential to form a mixed solution, the step of heating the mixed solution, the step of adding a reducing agent to the mixed solution under agitation to effect reduction and form particles comprising at least two metals differing in the reduction potential, the step of separating the metal particles from the solution and the step of dissolving out the metal having a lower reduction potential from said metal particles thereby to form a catalyst supported by said carrier.

5. A method of manufacturing a catalyst according to claim 1, wherein the carrier is at least one member selected from the group consisting of alumina, silica, titania, active carbon, carbon black, diatomaceous earth, chromium oxide, zirconia, tungsten oxide and porous polytetrafluoroethylene.

6. A method of manufacturing a catalyst according to claim 4, wherein said metal ions are palladium ion and platinum ion, and the palladium is dissolved out in the dissolving step.

7. A method of manufacturing a catalyst supported by a carrier comprising the steps:
   preparing a mixed solution of chloroplatinic acid and palladium chloride;
   adding an electrically-conductive carrier to the mixed solution;
   heating the carrier-containing liquid at a predetermined temperature;
   effecting reduction of the liquid by adding formic acid under agitation to form precipitate;
   separating the formed precipitate from the solution; and
   dissolving out palladium of the formed precipitate by treating with an acid, thereby to form a palladium-free platinum catalyst supported by said carrier.

8. A method of manufacturing a catalyst according to claim 4 or 7, wherein said carrier is active carbon, graphite or carbon black.

* * * * *